A. L. SWEARINGEN.
VEHICLE CHOCK.
APPLICATION FILED FEB. 27, 1908.
914,894.
Patented Mar. 9, 1909.
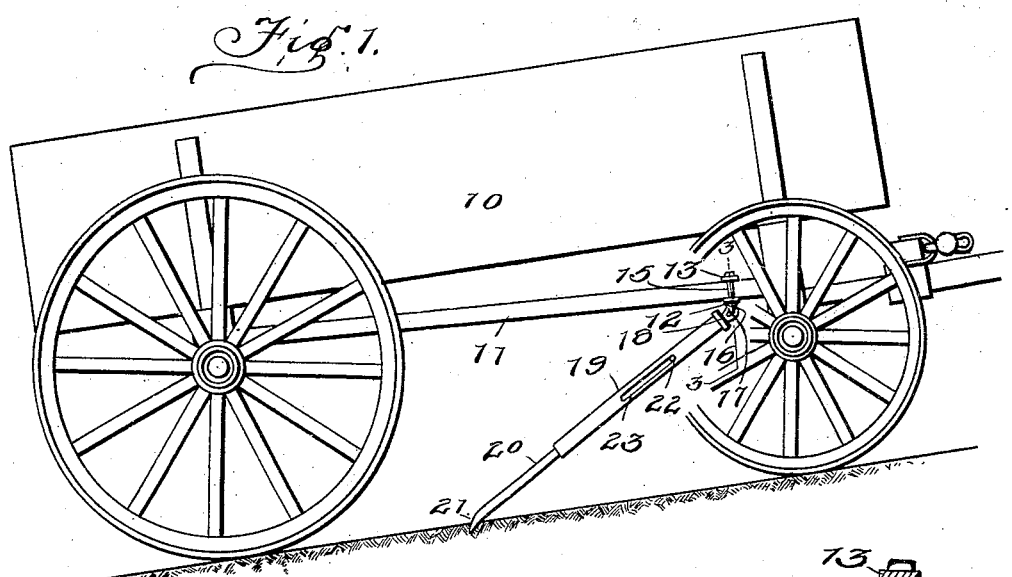
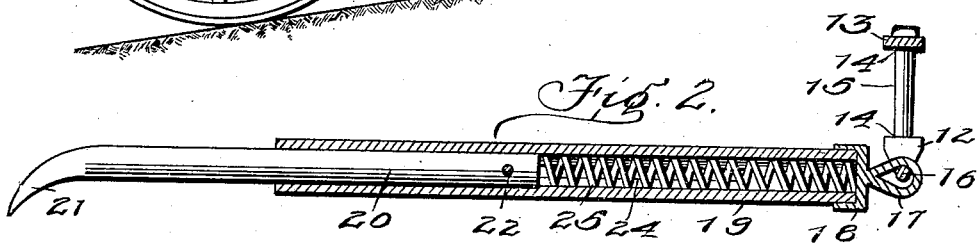
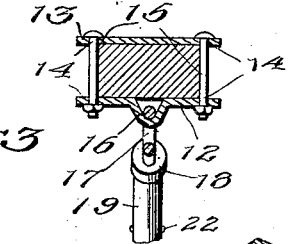
Witnesses
Inventor.
Aaron L. Swearingen.
By Woodward & Chandlee
Attorneys.

UNITED STATES PATENT OFFICE.

AARON L. SWEARINGEN, OF EATONS, WEST VIRGINIA.

VEHICLE-CHOCK.

No. 914,894.     Specification of Letters Patent.     Patented March 9, 1909.

Application filed February 27, 1908. Serial No. 418,114.

Be it known that I, AARON L. SWEARINGEN, a citizen of the United States, residing at Eatons, in the county of Wood and State of West Virginia, have invented certain new and useful Improvements in Vehicle-Chocks, of which the following is a specification.

This invention relates to vehicle chocks.

Heretofore the harness of a ferocious or balky animal has been broken or damaged incident to the animal jumping against the load to which he is attached and it is therefore an object of this invention to provide a chock which will effectively serve to prevent the above objection.

A further object of this invention is to provide a chock which will assist the starting of a vehicle and thus relieve the animal or animals from the strain incident to the load of said vehicle and thus enable the animal or animals to pull a heavier load.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a side elevational view of a vehicle showing the application of the present invention thereto, Fig. 2 is a longitudinal sectional view of the same, Fig. 3 is a transverse sectional view on the line 3—3 of Fig. 1, Fig. 4 is a detail perspective view of the lower end of the rod.

Referring now more particularly to the drawings, there is shown a vehicle 10 of usual construction, including a reach 11 therefor. Rearwardly of the forward axle of the vehicle, there is shown a metallic plate 12 and this plate is disposed beneath the reach 11, as shown. A plate 13 is disposed above the reach and this plate and the plate 12 are provided with alining passages 14 arranged to receive clamping bolts 15. The plate 12 is provided at its center with an offset portion 16. The offset portion 16 is thus arranged to receive an eye 17 formed upon a cap 18 secured upon the upper end of an elongated tube or pipe section 19. As shown, the eye 17 is elongated for the passage of the plate 12 therethrough to engage the eye with the portion 16. The tube or pipe section 19 is open at its lower end, and slidably arranged within the tube, there is shown a metallic rod 20 which is somewhat smaller than the tube 19. The lower end of the rod 20 is forked as indicated at 21 for engagement at times upon the road. The rod 20 adjacent its upper end is provided with a transversely extending pin 22 having portions disposed in longitudinally extending slots 23 and 24 respectively formed in the tube.

A heavy coil expansion spring 25 is located within the tube 19, and this spring is disposed between the cap 18 and the upper end of the rod 20, and thus serves to normally hold a portion of said rod extended outwardly of the tube. It will thus be seen that the tube is mounted for vertical movement beneath the vehicle, and may be elevated and supported therebeneath when not in use.

In travel of the vehicle up grade, should it be desired to stop the same, the chock is lowered, and the forked end of the rod 20 is engaged with the surface of the ground for effectively preventing back movement of the vehicle. It will of course be understood that the spring becomes compressed within the tube when the same is in use, and upon forward movement of the vehicle, the spring will expand and thus assist in moving said vehicle and consequently relieve the animal from strain.

What is claimed is:

In a chock attachment for wagons, the combination with an elongated tube having registering slots in its sides, of a rod slidably engaged in the tube, a transverse pin engaged in the rod and in the slots, a cap engaged with the upper end of the tube, a helical spring engaged between the upper end of the rod and the cap, a longitudinally extending elongated eye carried by the outer face of the cap, a plate engaged through the eye and having a depressed portion at its center in engagement with the eye, a second plate arranged in parallel relation to the first named plate, said plates having registering openings formed therethrough, and bolts removably engaged in the openings.

In testimony whereof I affix my signature, in presence of two witnesses.

AARON L. SWEARINGEN.

Witnesses:
   FRANK SWEARINGEN,
   SAMUEL HODGKISS.